(12) United States Patent
Koyanagi

(10) Patent No.: US 10,350,790 B2
(45) Date of Patent: Jul. 16, 2019

(54) TIRE MOLD AND METHOD FOR MANUFACTURING TIRE MOLD

(71) Applicant: BRIDGESTONE CORPORATION, Tokyo (JP)

(72) Inventor: Tomo Koyanagi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 195 days.

(21) Appl. No.: 15/305,765

(22) PCT Filed: May 20, 2015

(86) PCT No.: PCT/JP2015/064411
§ 371 (c)(1),
(2) Date: Oct. 21, 2016

(87) PCT Pub. No.: WO2015/182444
PCT Pub. Date: Dec. 3, 2015

(65) Prior Publication Data
US 2017/0043506 A1 Feb. 16, 2017

(30) Foreign Application Priority Data

May 27, 2014 (JP) .................................. 2014-109459

(51) Int. Cl.
*B29D 30/06* (2006.01)
*B29C 33/38* (2006.01)
(Continued)

(52) U.S. Cl.
CPC .......... *B29C 33/3828* (2013.01); *B29C 33/02* (2013.01); *B29C 33/3842* (2013.01);
(Continued)

(58) Field of Classification Search
CPC ............ B29D 30/0606; B29D 30/0629; B29D 30/0662; B29C 33/02; B29C 33/38; B29C 33/3828; B29C 2033/023
See application file for complete search history.

(56) References Cited

U.S. PATENT DOCUMENTS

| 4,515,541 A | 5/1985 | Salvadori |
| 4,568,259 A | 2/1986 | Mattson |

(Continued)

FOREIGN PATENT DOCUMENTS

| DE | 10 2012 108803 A1 | 3/2014 |
| EP | 2000290 A1 | 12/2008 |

(Continued)

OTHER PUBLICATIONS

Feb. 9, 2018 Search Report issued in Chinese Patent Application No. 2015800272297.

(Continued)

*Primary Examiner* — James P Mackey
(74) *Attorney, Agent, or Firm* — Oliff PLC

(57) ABSTRACT

A tire mold capable of imparting appropriate amounts of heat according to regions of an uncured tire is provided. The tire mold includes a base mold and a pattern mold which is fitted to the base mold and has a surface part for molding a tread pattern on the tire. A heat adjusting agent for adjusting amounts of heat to be transmitted to the tire via the surface part of the pattern mold is placed in a hollow cavity formed between the base mold and the pattern mold or inside the base mold.

8 Claims, 6 Drawing Sheets

(51) Int. Cl.
*B29C 33/02* (2006.01)
*B33Y 10/00* (2015.01)
*B33Y 80/00* (2015.01)
*C23C 4/12* (2016.01)

(52) U.S. Cl.
CPC .......... *B29D 30/0606* (2013.01); *B33Y 10/00* (2014.12); *B33Y 80/00* (2014.12); *C23C 4/12* (2013.01); *B29C 2033/023* (2013.01); *B29D 30/0662* (2013.01); *B29D 2030/0612* (2013.01); *B29D 2030/0616* (2013.01); *B29K 2905/12* (2013.01)

(56) References Cited

U.S. PATENT DOCUMENTS

| | | | | |
|---|---|---|---|---|
| 4,883,415 | A * | 11/1989 | Salvadori | B29C 33/305 425/47 |
| 5,775,402 | A * | 7/1998 | Sachs | B22C 9/065 164/4.1 |
| 7,540,730 | B1 * | 6/2009 | Ouvahia | B29C 33/04 425/40 |
| 7,572,120 | B2 * | 8/2009 | Ouyahia | B29D 30/0629 425/40 |
| 8,597,008 | B1 * | 12/2013 | Rex | B29C 33/3828 249/111 |
| 8,662,871 | B2 * | 3/2014 | Takagi | B29C 33/04 425/36 |
| 2002/0074479 | A1 * | 6/2002 | Frul | B29C 33/38 249/80 |
| 2011/0318532 | A1 | 12/2011 | Dusseaux et al. | |
| 2012/0263813 | A1 | 10/2012 | Takagi et al. | |

FOREIGN PATENT DOCUMENTS

| | | |
|---|---|---|
| EP | 2724849 A1 | 4/2014 |
| JP | S59-142127 A | 8/1984 |
| JP | S62-33610 A | 2/1987 |
| JP | S62-37107 A | 2/1987 |
| JP | 2001-347527 * | 12/2001 |
| JP | 2003-320595 A | 11/2003 |
| JP | 2004-034652 A | 2/2004 |
| JP | 2006-035615 A | 2/2006 |
| JP | 4382673 B2 | 12/2009 |
| JP | 2011-230331 A | 11/2011 |
| JP | 2012-512069 A | 5/2012 |
| WO | 2011/077844 A1 | 6/2011 |

OTHER PUBLICATIONS

Feb. 24, 2017 Search Report issued in European Patent Application No. 15799361.9.
Jun. 30, 2015 International Search Report issued in International Patent Application No. PCT/JP2015/064411.
Nov. 29, 2016 International Preliminary Report on Patentability issued in International Patent Application No. PCT/JP2015/064411.

* cited by examiner

TIRE MOLD AND METHOD FOR MANUFACTURING TIRE MOLD

TECHNICAL FIELD

The present invention relates to a mold for curing a tire. In particular, the invention relates to a tire mold capable of imparting appropriate amounts of heat according to regions of the tire and a method for manufacturing such a mold.

BACKGROUND ART

Conventionally, a tire curing apparatus for curing an uncured tire (green tire) has side molds for enclosing both side regions of the uncured tire and a plurality of crown molds for enclosing the crown region of the uncured tire. The tire curing apparatus accelerates the curing (vulcanization) of the uncured tire by transferring heat supplied from the outside to the tire through these molds.

The amount of heat imparted to the uncured tire from these molds is dependent on the heat transfer rate of the metal, which constitutes the molds. Thus, the amount of heat imparted to the uncured tire is nearly the same regardless of the regions of the tire.

FIG. 11A is a graph showing the degree of curing in the center area and the shoulder areas of the crown region of the tire cured with the mold giving a uniform amount of heat regardless of regions of the uncured tire. As shown in the graph, mainly due to the difference in gauge thickness, the degree of curing in the center area with a thinner gauge thickness rises more quickly than that in the shoulder areas with a thicker gauge thickness. At the point when the degree of curing in the shoulder areas with a thicker gauge thickness reaches a proper level, the degree of curing in the center area tends to exceed the proper level and thus cause an overcuring there. Therefore, it is difficult to achieve an optimum degree of curing in both the center area and the shoulder areas at the same time.

RELATED ART DOCUMENT

Patent Document

Patent Document 1: Japanese Patent No. 4382673

SUMMARY OF THE INVENTION

Problem to be Solved by the Invention

The present invention has been made in view of the foregoing problem, and an object of the invention is to provide a tire mold capable of imparting appropriate amounts of heat according to regions of an uncured tire.

Means for Solving the Problem

To solve the above-mentioned problem, a tire mold includes a base mold and a pattern mold which is fitted to the base mold and has a surface part for molding a tread pattern on a tire. And a heat adjusting agent for adjusting amounts of heat to be transmitted to the tire through the surface part of the pattern mold is placed in a hollow cavity formed between the base mold and the pattern mold or inside the base mold.

According to this arrangement, the heat transference can be controlled by the heat adjusting agent placed in the hollow cavity formed between the base mold and the pattern mold or inside the base mold. As a result, appropriate amounts of heat can be imparted according to regions of the tire. Also, the heat adjusting agent may be made of a material different from that of the pattern mold or the base mold, a metallic material, a powdery or granular material of these materials, or a product material produced by melting and then solidifying such powdery or granular material. Also, a plurality of hollow cavities may be provided independently of each other. What is meant by the state of being "provided independently of each other" is the state of the plurality of hollow cavities not communicating with each other.

Also, an embodiment of a method for manufacturing a tire mold to solve the above-described problem is for manufacturing a tire mold which includes a base mold and a pattern mold fitted to the base mold and having a surface part for molding a tread pattern on a tire. And the embodiment includes a step of providing a hollow cavity inside the base mold, a step of providing a heat adjusting agent supply-discharge passage communicating between the hollow cavity and outside of the base mold, and a step of introducing a heat adjusting agent made of a material different from that of the base mold into the hollow cavity through the heat adjusting agent supply-discharge passage.

According to this embodiment, a heat adjusting agent made of a material different from that of the base mold is introduced into the hollow cavity through the heat adjusting agent supply-discharge passage. Hence, the tire mold features a base mold holding a heat adjusting agent within the hollow cavity therein.

It should be noted that the foregoing summary of the invention does not necessarily recite all the features essential to the invention. Therefore, it is to be understood that the individual arrangements constituting these groups of features also fall within the scope of the invention.

MODE FOR CARRYING OUT THE INVENTION

The invention will now be described in detail based on preferred embodiments which do not intend to limit the scope of the claims of the present invention but exemplify the invention. All of the features and the combinations thereof described in the embodiments are not necessarily essential to the invention.

First Embodiment

Figure 1:
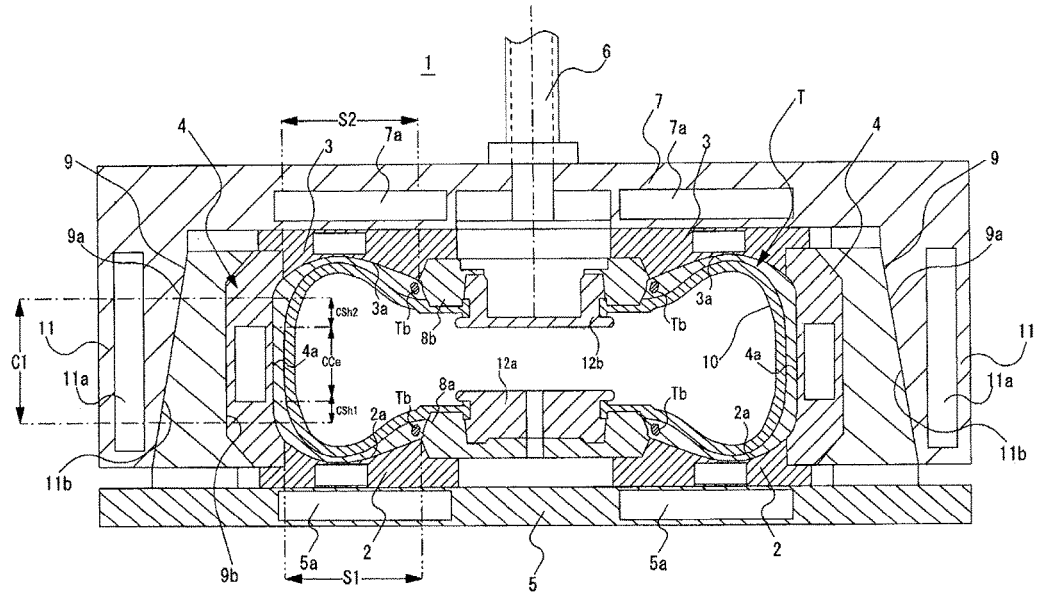
FIG. 1 is a schematic cross section showing a curing apparatus.

FIG. 1 is a schematic cross section of a curing apparatus 1. As is shown in the illustration, the curing apparatus 1 includes a side mold 2, which molds and cures one side region S1 of an uncured tire T (hereinafter referred to simply as "tire") placed horizontally on its side with the central axis of rotation extending vertically and a side mold 3, which molds and cures the other side region S2 the tire T, placed opposite to the lower side mold 2. The curing apparatus 1 further includes a plurality of sector molds 4 for molding and curing the crown region C1, which are arranged annularly along the crown region C1, which would become the contact patch of the tire T, between the side molds 2 and 3.

The tire T is, for instance, an uncured tire having been molded on a not-shown tire molding drum. The tire T, as it is placed in the curing apparatus 1, is constituted by such not-shown component members as a carcass extending toroidally astride a pair of bead regions Tb, Tb disposed vertically apart from each other, a plurality of belts stacked on the carcass and a tread rubber in the crown region C1, and side rubbers disposed on the carcass in the side regions S1, S2.

The side mold 2 is a disk-shaped mold with an open central section. The side mold 2 molds the surface of the side region S1 with the molding surface 2a in contact with the side region S1 extending from the vicinity of one of the bead regions Tb, Tb toward the crown region C1 with the tire T placed on its side. Also, the side mold 2 is placed on a base 5 which has a heating chamber 5a therein. The heating chamber 5a is an annular flow channel formed in the base 5 in such a manner as to be opposite to the outer periphery of the side mold 2. As will be described in detail later, a heating medium is supplied into the heating chamber 5a from a not-shown heat source supply unit. The heat produced by the heating medium is transferred to the side region S1 via the side mold 2. The open section of the side mold 2 is closed by a bead ring 8a, which molds the periphery of one of the bead regions Tb, Tb, and a clamp ring 12a, which holds the bladder 10 to be discussed later.

The side mold 3, as with the side mold 2, is a disk-shaped mold with an open central section. The side mold 2 molds the surface of the side region S2 with the molding surface 3a in contact with the side region S2 extending from the vicinity of the other of the bead regions Tb, Tb toward the crown region C1 with the tire T placed on its side. The side mold 3 is placed below the lower face of an outer ring 7 which rises and lowers along with the up-and-down movement of a center post 6. Provided inside the outer ring 7 is a heating chamber 7a. The heating chamber 7a is an annular flow channel formed inside the outer ring 7 in such a manner as to be opposite to the outer periphery of the side mold 3. A heating medium is supplied into the heating chamber 7a from a not-shown heat source supply unit, as with the heating chamber 5a. The heat produced by the heating medium is transferred to the side region S2 via the side mold 3. The open section of the side mold 3 is closed by a bead ring 8b, which molds the periphery of the other of the bead regions Tb, Tb, and a clamp ring 12b, which holds the bladder 10 to be discussed later.

The plurality of sector molds 4 enclose the crown region C1 of the tire T annularly as they are combined with each other circumferentially. The sector molds 4 are, for instance, 8 divisions along the circumference of the tire T. A pattern molding surface 4a that comes in contact with the crown region C1 has raised and recessed portions for molding a predetermined tread pattern on the surface of the crown region C1. As the pattern molding surface 4a comes in contact with the surface of the crown region C1, a tread pattern having inverted recesses and projections formed by the pattern molding surface 4a is molded on the crown region C1. It is to be noted that as will be described in detail later, the sector mold 4 is comprised of a base mold 20, which is abase member, and a pattern mold 30, which is a pattern molding member detachably fitted to the base mold 20.

The plurality of sector molds 4 are held by a plurality of segments 9 which are movable radially wider or narrower along a slider mechanism disposed on the base 5. The outer periphery 9a of the segments 9 is formed as an inclined surface of the same gradient as that of the inner periphery 11b of the arm portion 11 of the outer ring 7. At the start of a curing process, the center post 6 is lowered to have the inner periphery 11b of the arm portion 11 slide along the outer periphery 9a of the segment 9, thus radially moving the plurality of segments 9 narrower. And as the center post 6 reaches the lowering limit position, the plurality of sector molds 4 enclose the crown region C1 of the tire T without gaps therebetween. Formed inside the arm portion 11 of the outer ring 7 is an annular heating chamber 11a so disposed as to be opposite to the outer periphery 9a of the segments 9. As with the other heating chambers 5a and 7a, a heating medium is supplied to the heating chamber 11a from a not-shown heat source supply unit. The heat produced by the heating medium is transferred to the crown region C1 via the segments 9 and the sector molds 4. When stripping the tire T from the mold on completion of the curing process, the center post 6 is raised to free the hold on the segments 9 by the arm portion 11 of the outer ring 7 and cause the segments 9 to spread radially.

A bladder 10 is placed on the inner periphery side of the tire T enclosed by the side molds 2 and 3 and the plurality of sector molds 4. The bladder 10 is of an elastic material inflatable by a fluid supplied from the outside of the curing apparatus 1. As the bladder 10 is inflated, the outer periphery of the bladder 10 comes into tight contact with the inner periphery of the tire T and pushes the outer periphery of the tire T against the side molds 2 and 3 and the plurality of sector molds 4.

As described above, the tire T inside the curing apparatus 1 is held in a state of being pressed by the side molds 2 and 3, the plurality of sector molds 4, and the bladder 10. Further, the tire T is heated by the heating medium supplied into the plurality of heating chambers 5a, 7a, and 11a as the curing progresses by degrees.

Supplied into the plurality of heating chambers 5a, 7a, and 11a is a heating medium, such as steam or a high-temperature inert gas, from a not-shown heat source supply unit via a not-shown feed pipe. The heat source supply unit is equipped with a controller for adjusting the temperature and flow rate of the heating medium to be supplied to the heating chambers 5a, 7a, and 11a. And the controller controls the temperature and flow rate of the heating medium supplied into the plurality of heating chambers 5a, 7a, and 11a by controlling the heater for adjusting the temperature of the heating medium and a flow regulating valve disposed on the feed pipe.

The side mold 2 and the bead ring 8a sitting on the base 5 are gradually heated by the heating medium supplied into the heating chamber 5a. The heat transferred to the side mold 2 is transferred mainly to the side region S1 of the tire T, which is in contact with the molding surface 2a of the side mold 2, thus accelerating the curing of the side region S1. Also, the heat transferred to the bead ring 8a is transferred mainly to one of the bead regions Tb, Tb of the tire T, which is in contact with the bead ring 8a, thus accelerating the curing of the bead region Tb.

The side mold 3 and the bead ring 8b placed under the lower face of the outer ring 7 are gradually heated by the heating medium supplied into the heating chamber 7a. The heat transferred to the side mold 3 is transferred mainly to the side region S2 of the tire T, which is in contact with the molding surface 3a of the side mold 3, thus accelerating the curing of the side region S2. Also, the heat transferred to the bead ring 8b is transferred mainly to the other of the bead regions Tb, Tb of the tire T, which is in contact with the bead ring 8b, thus accelerating the curing of the bead region Tb.

The segment 9, which comes in contact with the inner periphery 11b of the arm portion 11 of the outer ring 7, and the sector molds 4, which are held in contact with the inner periphery of the segment 9, are gradually heated by the heating medium supplied into the heating chamber 11a. The heat transferred to the sector molds 4 is transferred mainly to the crown region C1 of the tire T through the pattern molding surface 4a of the sector molds 4, thus accelerating the curing of the crown region C1.

And the sector molds 4 according to this embodiment is so structured as to create a difference between the amount of heat given to the center area CCe of the crown region C1 and the amount of heat given to the shoulder areas CSh1 and CSh2 in the crown region C1 during the period from the start to the end of the curing process. In this structure, appropriate amounts of heat are given to the center area CCe and the shoulder areas CSh1 and CSh2, respectively.

Hereinbelow, the structure of the sector molds 4 will be explained in detail with reference to FIG. 2 and FIG. 3. It is to be noted that the ranges of the center area CCe and the shoulder areas CSh1 and CSh2 vary with the profile of the crown region C1 of the tire T. Let us define here the center area CCe as at least an area astride the axial center (tire center TC) of the crown region C1 of the tire T and the shoulder areas CSh1 and CSh2 as the remaining areas save the center area CCe.

Figure 2:
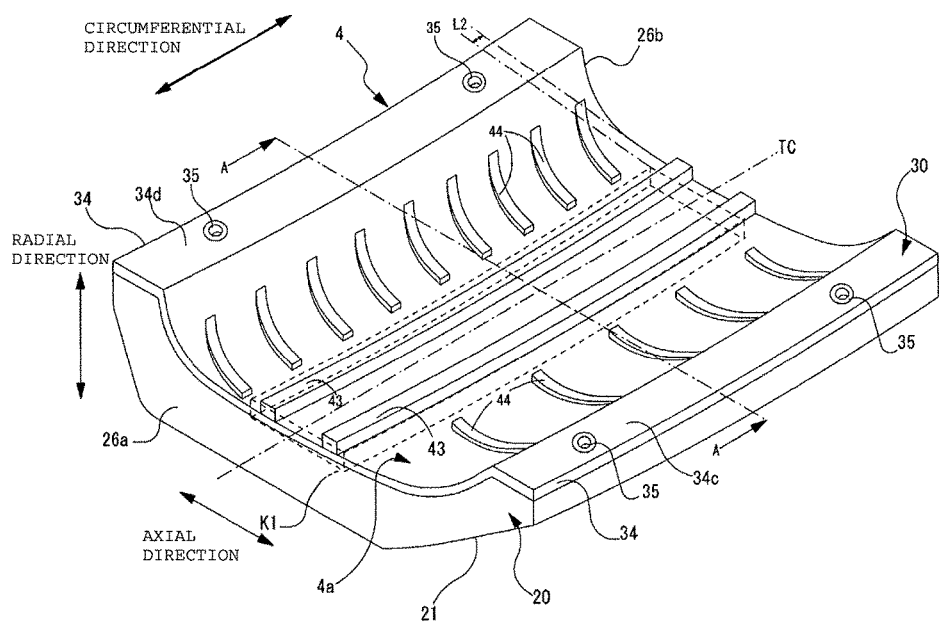
FIG. 2 is an overall perspective view of a sector mold.

FIG. 2 is a schematic perspective view showing a sector mold 4 out of a plurality of sector molds 4. FIG. 3 is an axial cross section (II-II (A-A) of FIG. 2) of a sector mold 4. It is to be noted that "the axial direction", "the circumferential direction", and "the radial direction" as used herein refer to the directions of the tire T placed in a curing apparatus 1 as shown in FIG. 1.

As shown in FIG. 2, the sector mold 4 is structured as an assembly of the base mold 20 as a metallic base member and the pattern mold 30 having a pattern molding surface 4a as already described. The base mold 20 and the pattern mold 30 are made of a metallic material, such as aluminum, iron, or stainless steel. Also, although the details will be discussed later, the base mold 20 and the pattern mold 30 can be molded by a general metal casting process or an additive manufacturing process to be discussed later, according to their basic models. Hereinbelow, a description is given of the specific shapes of the base mold 20 and the pattern mold 30.

Figure 3:
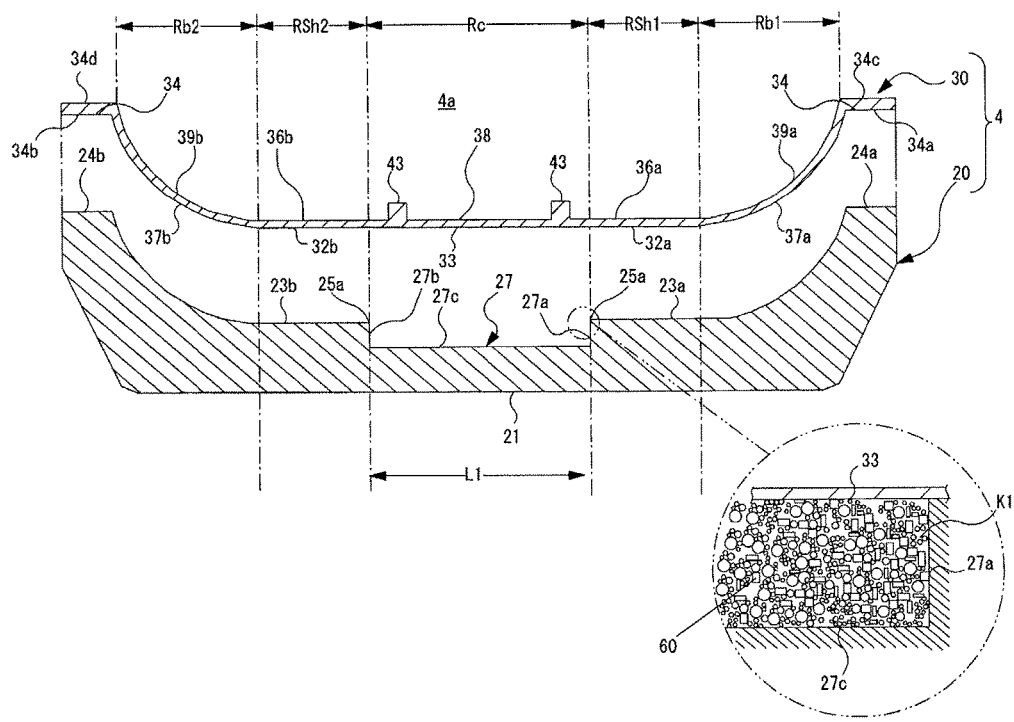
FIG. 3 illustrates an axial cross section (A-A section of FIG. 2) of a sector mold.

As shown in FIG. 3, the base mold 20 as the base member is shaped in correspondence to the inner periphery 9b of the segment 9 and has an outer periphery 21 held face to face with the inner periphery 9b. The outer periphery 21, having a shape corresponding to the inner periphery 9b of the segment 9, comes into close contact with the inner periphery 9b of the segment 9. Formed on the side of the base mold 20 opposite to the outer periphery 21 thereof are fitting surfaces 23a and 23b for supporting the pattern mold 30. The fitting surfaces 23a and 23b are axially curved surfaces having the curvatures substantially the same as those of the shoulder-area outer peripheries 32a and 32b corresponding to the shoulder molding ranges RSh1 and RSh2 of the pattern mold 30 and the buttress-area outer peripheries 37a and 37b corresponding to the buttress molding ranges Rb1 and Rb2 thereof. With the pattern mold 30 fitted to the base mold 20, the fitting surfaces 23a and 23b come in close contact with the ranges of the shoulder-area outer peripheries 32a and 32b and the buttress-area outer peripheries 37a and 37b of the pattern mold 30. Formed on the axially outer sides of the fitting surfaces 23a and 23b are joining surfaces 24a and 24b that come in contact with the outer joining surfaces 34a and 34b, respectively, of the joining flanges 34, 34 of the pattern mold 30.

As shown in FIG. 2, a plurality of bolt holes (not shown) in positions corresponding to the plurality of bolt holes 35 penetrating the joining flanges 34, 34 of the pattern mold 30 are provided in the joining surfaces 24a and 24b. The assembly of the base mold 20 and the pattern mold 30 is done by aligning the plurality of bolt holes 35 in the pattern mold 30 with the not-shown plurality of bolt holes in the base mold 20 and screwing in the not-shown bolts from the bolt holes 35 side.

As shown in FIG. 2 and FIG. 3, the circumferential end faces 26a and 26b, which connect the outer periphery 21 with the fitting surfaces 23a and 23b and the joining surfaces 24a and 24b, are abutted on the circumferential end faces 26b and 26a of the base molds 20 of the respectively adjacent sector molds 4.

As shown in FIG. 3, an agent holding recess 27 depressed in the direction of the outer periphery 21 is provided on the fitting surfaces 23a and 23b side, namely, the pattern-mold-fitting side, of the base mold 20. The agent holding recess 27 covers an area extending between the axially inner end 25a of one fitting surface 23a and the axially inner end 25a of the other fitting surface 23b. The agent holding recess 27 is formed in a rectangular cross section having lateral sides 27a and 27b extending substantially vertically from the axially inner ends 25a, 25a as the base points toward the outer periphery 21 side and a bottom surface 27c connecting the end points of the lateral sides 27a and 27b. The axial dimension L1 of the agent holding recess 27 is set substantially the same as the axial dimension of the center-area molding range Rc of the pattern mold 30. Also, the circumferential dimension of the agent holding recess 27 may be set shorter than the dimension between the circumferential end faces 26a and 26b. On the other hand, it is preferable that the dimension L2 (thickness) between the circumferential end faces 26a and 26b and the respective circumferential ends of the agent holding recess 27 is set to about 1 mm to 10 mm, for instance, in order to make the interval where the agent holding recess 27 does not exist narrower when the plurality of adjacent sector molds are combined together.

Next, a description is given of the pattern mold 30 to be fitted to the base mold 20.

As already described, the pattern mold 30 has shoulder-area outer peripheries 32a and 32b and buttress-area outer peripheries 37a and 37b, which come in contact with the fitting surfaces 23a and 23b, respectively, of the base mold 20, and a center-area outer periphery 33, which extends linearly between the shoulder-area outer peripheries 32a and 32b. The center-area outer periphery 33 is formed of substantially the same dimension as the axial dimension L1 of the agent holding recess 27. And with the pattern mold 30 fitted to the base mold 20, the center-area outer periphery 33 closes the open top opposite the bottom surface 27c of the agent holding recess 27. With the open top of the agent holding recess 27 closed by the center-area outer periphery 33, a space K1, which is sealed by the agent holding recess 27 and the center-area outer periphery 33, is created in the sector mold 4, that is, between the base mold 20 and the pattern mold 30. Although the detail will be discussed later, a heat adjusting agent 60 is held inside the space K1.

Formed continuously on the opposite side of the center-area outer periphery 33, the shoulder-area outer peripheries 32a and 32b, and the buttress-area outer peripheries 37a and 37b are the center-area inner periphery 38, the shoulder-area inner peripheries 36a and 36b, and the buttress-area inner peripheries 39a and 39b constituting the above-described pattern molding surface 4a, respectively. As shown in FIG. 2 and FIG. 3, formed on the center-area inner periphery 38 are a plurality of main groove molding projections 43. The plurality of main groove molding projections 43 extend continuously in the circumferential direction on the center-area inner periphery 38 and are formed at equal distances from the tire center TC therebetween. Also, a plurality of lateral groove molding projections 44 are formed on the shoulder-area inner peripheries 36a and 36b. The plurality of lateral groove molding projections 44 are arranged at equal intervals in the circumferential direction on the shoulder-area inner peripheries 36a and 36b and extend in arcs from the main groove molding projection 43 side toward the joining outer faces 34c and 34d, respectively. In this manner, provided on the shoulder-area inner peripheries 36a and 36b and the center-area inner periphery 38 constituting the pattern molding surface 4a are projections that mold a desired tread pattern on the crown region C1 of the tire T to be cured. And with the tire T cured, as it is pressed against the pattern molding surface 4a, the crown region C1 of the tire T will have a tread pattern formed that has a contact patch surface having lands and grooves in the inverted shapes of the above-mentioned projections. It should be noted, however, that the shape of the pattern molding surface 4a here is an example only. And it is possible to mold various tread patterns on the outer periphery of the crown region C1 by changing the number, shape, and dimensions of the main groove molding projections 43 and the lateral groove molding projections 44 and other factors. Also, although not shown in the illustration, predetermined projections and recesses are formed on the buttress-area inner peripheries 39a and 39b as well.

Next, a description is given of a heat adjusting agent 60 to be placed within the sector mold 4 of a structure as described above. As already mentioned, the heat adjusting agent 60 according to the present embodiment is held inside the sealed space K1 between the base mold 20 and the pattern mold 30. It is to be appreciated here that the heat adjusting agent 60 may be of any material as long as it contains at least a material different from the material of the base mold 20 or the pattern mold 30 constituting the sector mold 4. It may be a solid, such as metal or resin, a liquid, such as water or oil, or a mixture of such materials. In the case where a metal material is to be held in the space K1, the heat adjusting agent 60 that can be employed widely may include metallic powder, particles, and chips of iron, aluminum, stainless steel, copper, silver, etc., and powdery or granular materials which are mixtures of these metals. Also, where a resin is to be held there, the heat adjusting agent 60 that can be employed widely may include resin powder, particles, and chips of rubber, polyethylene, polypropylene, ABS, etc., or powdery or granular materials which are mixtures of these resins. And there are no limitations on the particle diameter of various powder or granules constituting the powdery or granular materials and the area, volume, surface shape and roughness of the chips as long as they can be held within the space K1.

And by placing the heat adjusting agent 60 formed of any of the above-cited powdery or granular materials within the space K1, the heat transference inside the space K1 can be controlled by adjusting the material, size, density, mixing ratio, etc., of the powder or the like constituting the powdery or granular material. And the amount of heat given to the center area CCe from the center-area inner periphery 38 corresponding in position and range to the space K1 can be adjusted as desired.

More specifically, if, for instance, the base mold 20 and the pattern mold 30 are made of aluminum, then a powdery or granular material of iron, not aluminum, is to be used as the heat adjusting agent 60 to be held in the space K1. Then it becomes possible to control the heat transference inside the space K1 more than the heat transference of other parts then the space K1. Thus, the amount of heat imparted to the center area CCe of the tire T via mainly the center-area inner periphery 38 during the predetermined period of time from the start of curing is controlled to be lower than the amount of heat imparted to the shoulder areas CSh1 and CSh2 of the tire T via the shoulder-area inner peripheries 36a and 36b.

Figure 11A:
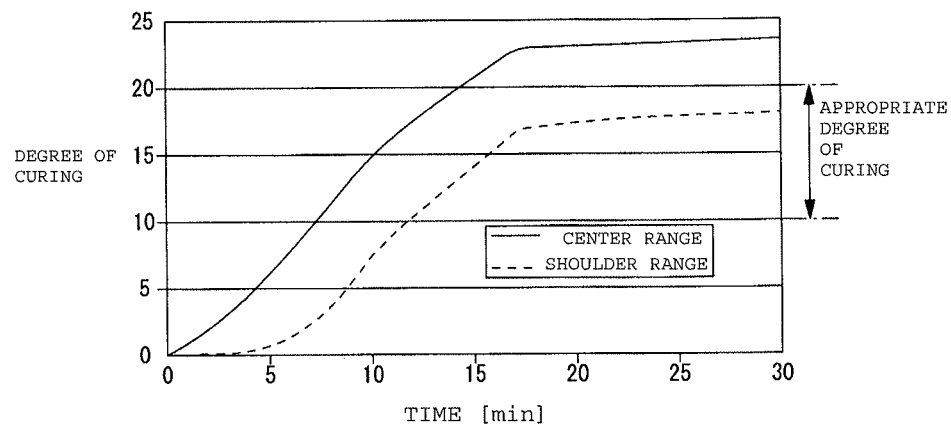
FIGS. 11A and 11B are graphs showing changes in the degree of curing with time.
Figure 11B:
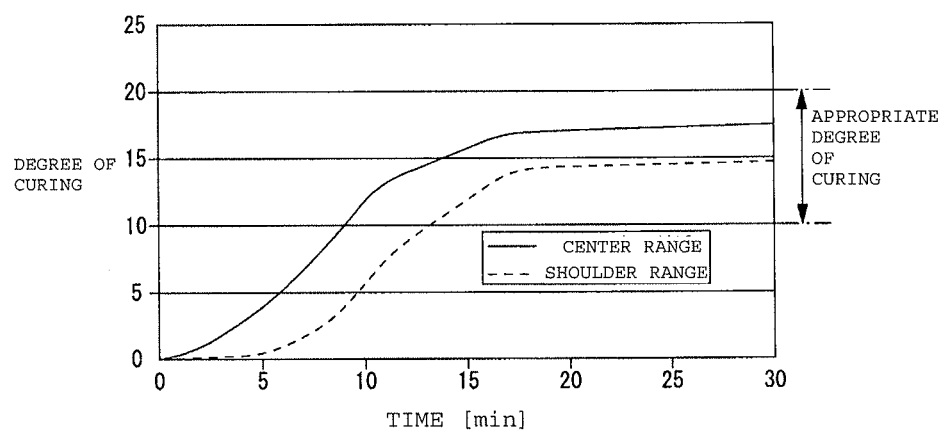

FIG. 11B is a graph showing the change in the degree of curing with time of the center area CCe and the shoulder areas CSh1 and CSh2 of the crown region C1 of the tire cured by the curing apparatus 1 equipped with the sector molds 4 according to the above-described embodiment. The sector molds 4 according to this embodiment are such that the amount of heat imparted to the center area CCe having the gauge thickness thinner than the shoulder areas CSh1 and CSh2 is controlled to be lower. As is clear from comparison with FIG. 11A, therefore, it is confirmed that the degrees of curing of the center area CCe and the shoulder areas CSh1 and CSh2 are both within an appropriate range at the predetermined time (e.g., 30 minutes) elapsed from the start of curing.

Second Embodiment

Figure 4:
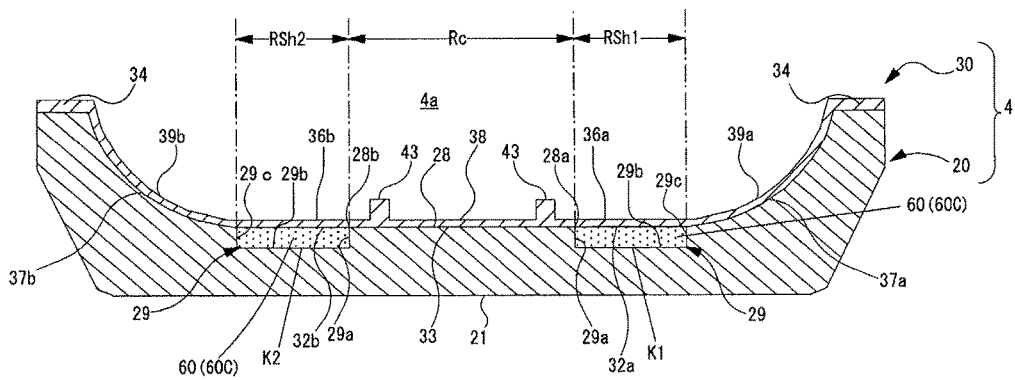
FIG. 4 illustrates an axial cross section of a sector mold according to another embodiment (second embodiment).

FIG. 4 is an axial cross section of a sector mold 4 according to another embodiment (second embodiment). Compared with the sector mold 4 in the first embodiment, the sector mold 4 in this embodiment differs in that the spaces K1 and K2 are provided in positions approximately corresponding to the shoulder-area molding ranges RSh1 and RSh2 and that a heat adjusting agent 60 formed of a metallic powdery or granular material whose thermal conductivity is higher than that of the metal of the sector mold 4 is held within the spaces K1 and K2.

In the present embodiment, the base mold 20 has a fitting surface 28 which is of substantially the same dimension as the axial dimension of the center-area molding range Rc of the pattern mold 30 to be fitted thereto and comes in contact with the center-area outer periphery 33 of the pattern mold 30. Provided on both axial sides of the fitting surface 28 are agent holding recesses 29, 29 depressed in the direction of the outer periphery 21, respectively. The agent holding recesses 29, 29 are formed with lateral sides 29a, 29a extending substantially vertically from the axially outer ends 28a, 28b of the fitting surface 28 as the base points toward the outer periphery 21, bottom surfaces 29b, 29b extending axially outwardly from the ends at the lateral sides 29a and 29a, and lateral sides 29c, 29c rising opposite to the lateral sides 29a, 29a, respectively. The axial dimensions of the bottom surfaces 29b, 29b of the agent holding recesses 29, 29 correspond to the shoulder-area molding ranges RSh1 and RSh2.

In the present embodiment, the pattern mold 30 has a center-area outer periphery 33, which comes in contact with the fitting surface 28 of the base mold 20, shoulder-area outer peripheries 32a and 32b, which extend in correspondence with the bottom surfaces 29b, 29b, and buttress-area outer peripheries 37a and 37b. And with the pattern mold 30 fitted to the base mold 20, the shoulder-area outer peripheries 32a and 32b close the open tops opposite the bottom surfaces 29b, 29b of the agent holding recesses 29, 29. With the open tops of the agent holding recesses 29, 29 closed by the shoulder-area outer peripheries 32a and 32b, spaces K1 and K2, which are enclosed by the agent holding recesses 29, 29 and the shoulder-area outer peripheries 32a and 32b, are created independently without communicating with each other.

Next, a description is given of a heat adjusting agent 60 according to the present embodiment. The heat adjusting agent 60 in this embodiment is held inside the spaces K1 and K2 formed in positions corresponding to the shoulder-area molding ranges RSh1 and RSh2. For example, if the base mold 20 and the pattern mold 30 are made of iron, the heat adjusting agent 60 to be held inside the spaces K1 and K2 may preferably be of a powdery or granular material of aluminum, silver, copper, or the like whose thermal conductivity is higher than that of iron. And the heat adjusting agent 60 is held densely within the spaces K1 and K2.

In this manner, the heat adjusting agent 60, which is configured by a powdery or granular material whose thermal conductivity is higher than that of the metal of the base mold 20 and the pattern mold 30, is held densely within the spaces K1 and K2. Thus, it becomes possible to raise the heat transference inside the spaces K1 and K2 higher than the other parts excluding the spaces K1 and K2. Accordingly, the amount of heat imparted to the shoulder areas CSh1 and CSh2 of the tire T via mainly the shoulder-area inner peripheries 36a and 36b during the predetermined period of time from the start of curing is controlled to be greater than the amount of heat imparted to the center area CCe of the tire T via the center-area inner periphery 38 where there are no spaces K1 and K2. Therefore it is possible to achieve appropriate degrees of curing in the center area CCe and the shoulder areas CSh1 and CSh2 at the end of a curing process.

Third Embodiment

Figure 5:
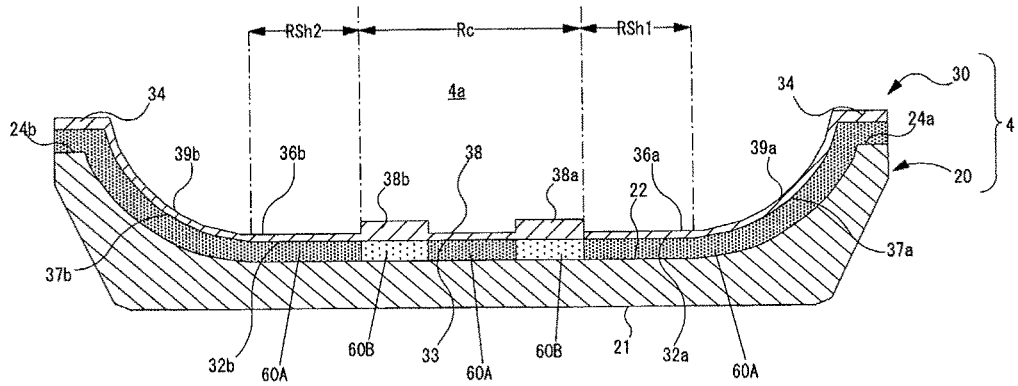
FIG. 5 illustrates an axial cross section of a sector mold according to another embodiment (third embodiment).

FIG. 5 is an axial cross section of a sector mold 4 according to another embodiment (third embodiment). In the foregoing embodiments, descriptions have been given of examples in which a heat adjusting agent 60 is held within the space K1 and the space K2 sealed as the base mold 20 and the pattern mold 30 are fitted together. Compared with the sector mold 4 according to the first embodiment or the second embodiment, the sector mold 4 in the present embodiment differs in that the heat adjusting agent 60 is held (sandwiched) between the base mold 20 and the pattern mold 30. That is, the base mold 20 according to this embodiment does not have the agent holding recess 27 or the agent holding recesses 29, 29 which can provide the spaces K1 and K2 of the foregoing embodiments. The heat adjusting agent 60 is laid in a carpet of predetermined thickness all over the axial area of the inner periphery 22 of the base mold 20. And the heat adjusting agent 60 is held between the inner periphery 22 and the center-area outer periphery 33 and the shoulder-area outer peripheries 32a and 32b of the pattern mold 30 mating with the inner periphery 22. With this arrangement implemented, the interposition range of the heat adjusting agent 60 can be set or changed as desired without relying on the shape of the agent holding recess 27 or the agent holding recesses 29, 29. Thus the heat transference can be adjusted minutely according to the regions with different gauge thicknesses of the tire T to be cured. The specifics will be explained hereinbelow.

As shown in FIG. 5, the heat adjusting agent 60 in the present embodiment consists of a heat adjusting agent 60A and a heat adjusting agent 60B, which is different from the heat adjusting agent 60A. The heat adjusting agent 60A and the heat adjusting agent 60B are held between the base mold 20 and the pattern mold 30 alternately in the axial direction. It is to be noted here that the heat adjusting agent 60A is, for instance, of a powdery or granular material of aluminum, copper, silver, or the like, and the heat adjusting agent 60B is, for instance, of a powdery or granular material of iron which has a thermal conductivity lower than that of the heat adjusting agent 60A. Also, provided on the center-area inner periphery 38 of the pattern mold 30 in this embodiment are a plurality of block groove molding projections 38a and 38b for molding not-shown block grooves of the tire T. Note that the parts other than the block groove molding projections 38a and 38b on the center-area inner periphery 38 are parts for molding not-shown blocks (land portions) that come in contact with the road surface or the like.

The heat adjusting agent 60B is held between the base mold 20 and the pattern mold 30 in positions and ranges corresponding to the block groove molding projections 38a and 38b. And the heat adjusting agent 60A is held therebetween in the remaining ranges. With this arrangement implemented, at the center-area inner periphery 38, the amount of heat imparted to the center area CCe of the tire T via the plurality of block groove molding projections 38a and 38b can be controlled to be lower than the amount of heat imparted via the parts other than the block groove molding projections 38a and 38b. Therefore it is possible to prevent an overcuring of the block groove regions with thinner gauge thickness and achieve appropriate degrees of curing in the center area CCe and the shoulder areas CSh1 and CSh2 at the end of curing.

In this manner, the heat adjusting agent 60 is held (sandwiched) between the base mold 20 and the pattern mold 30. Thus the positions and ranges of the heat adjusting agent 60 can be set as desired according to the specific shapes of the center-area inner periphery 38 and the shoulder-area inner peripheries 36a and 36b, that is, the gauge thicknesses changing with the pattern on the crown region C1 of the tire T to be molded by the pattern mold 30. As a result, the heat transference can be easily controlled according to the type of the tire T to be cured.

Fourth Embodiment

Figure 6:
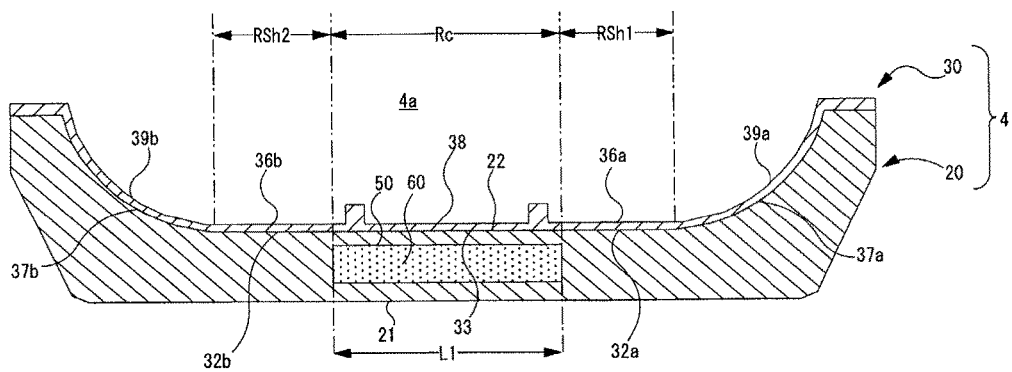
FIG. 6 illustrates an axial cross section of a sector mold according to another embodiment (fourth embodiment).

FIG. 6 is an axial cross section of a sector mold 4 according to another embodiment (fourth embodiment). In the foregoing embodiment, a description has been given of an example in which a heat adjusting agent 60 is held between the base mold 20 and the pattern mold 30. The sector mold 4 in the present embodiment differs in that the heat adjusting agent 60 is held in a hollow cavity 50 formed inside the base mold 20. The hollow cavity 50 is a hollow space of an approximately rectangular cross section extending continuously in the axial direction inside the sector mold 4, that is, between the outer periphery 21 and the inner periphery 22. The axial dimension L1 of the hollow cavity 50 is set to be substantially the same as the axial dimension of the center-area molding range Rc of the pattern mold 30. That is, provided inside the base mold 20 according to the present embodiment is a hollow cavity 50 corresponding in position and range to the center-area molding range Rc for molding the center area CCe of the crown region C1. It is to be noted that the circumferential dimension of the hollow cavity 50, as with the above-described agent holding recess 27 and agent holding recesses 29, 29, may be a dimension shorter than the dimension between the circumferential end faces 26a and 26b shown in FIG. 2. Also, it is desirable that the dimension between the end faces 42a and 42b and the respective circumferential ends of the hollow cavity 50 is set at 1 mm to 10 mm, for instance, from the viewpoint of minimizing the interval where there is no hollow cavity 50 when a plurality of neighboring sector molds 4 are assembled with each other.

Held loosely inside the hollow cavity 50 is a heat adjusting agent 60 of, for instance, a powdery or granular material of aluminum which is a material different from that of the base mold 20 and the pattern mold 30. With the heat adjusting agent 60 held loosely in the hollow cavity 50, it becomes possible to decrease the heat transference within the hollow cavity 50 to be below that in the parts where there is no hollow cavity 50. It is to be noted, however, that even when the heat adjusting agent 60 is held densely therein, the heat transference within the hollow cavity 50 is reduced below that in the parts where there is no hollow cavity 50. Hence, loose or dense filling of the heat adjusting agent 60 may be determined as appropriate. With this arrangement implemented, the amount of heat imparted to the center area CCe of the tire T via mainly the center-area inner periphery 38 during the predetermined period of time from the start of curing is controlled to be lower than the amount of heat imparted to the shoulder areas CSh1 and CSh2 of the tire T via the shoulder-area inner peripheries 36a and 36b. And it is possible to prevent the overcuring of the center area CCe with thinner gauge thickness when the degree of curing in the shoulder areas CSh1 and CSh2 of the tire T has reached an appropriate level with the progress of curing and achieve appropriate degrees of curing in both the center area CCe and shoulder areas CSh1 and CSh2 at the end of curing.

It is to be noted that, although not shown, the arrangement may be such that a plurality of hollow cavities 50 are provided in positions and ranges corresponding to the shoulder-area molding ranges RSh1 and RSh2 and that the heat adjusting agent 60 is held within the plurality of hollow cavities 50. In this manner, the heat transference in the hollow cavities corresponding in positions and ranges to the shoulder-area molding ranges RSh1 and RSh2 can be made higher than that in the other parts.

Fifth Embodiment

Figure 7:
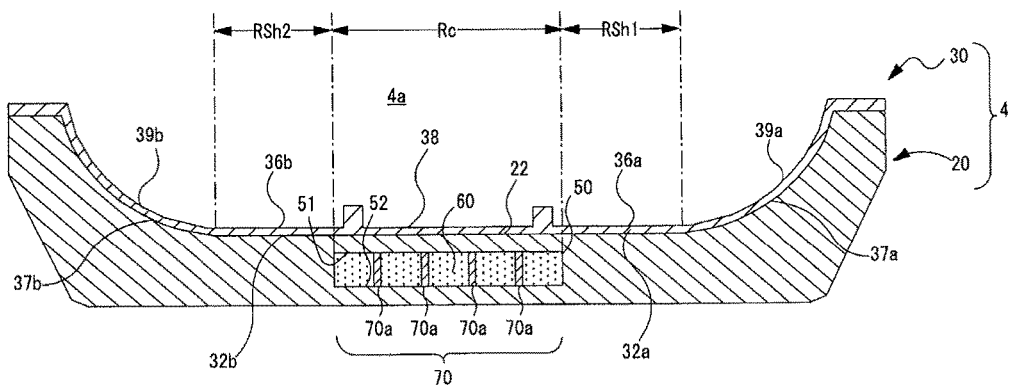
FIG. 7 illustrates an axial cross section of a sector mold according to another embodiment (fifth embodiment).

FIG. 7 is an axial cross section of a sector mold 4 according to another embodiment (fifth embodiment). Compared with the sector mold 4 in the fourth embodiment, the sector mold 4 in the present embodiment differs in that a heat transfer assisting member 70 is formed within the hollow cavity 50 holding a heat adjusting agent 60. As shown in the illustration, the heat transfer assisting member 70 is constituted by a plurality of columnar members 70a extending between the radially inner surface 51 and the radially outer surface 52 defining the shape of the hollow cavity 50. The plurality of columnar members 70a are formed of the same metal as that of the sector mold 4 or of a metal having a different thermal conductivity. Also, the plurality of columnar members 70a are, for instance, arranged within the hollow cavity 50 at equal intervals axially and circumferentially.

With the heat transfer assisting member 70 disposed in this manner, heat can easily reach the center-area molding range Rc by way of the heat transfer assisting member 70 inside the hollow cavity 50. Thus, the heat transference inside the hollow cavity 50 can be controlled by setting as appropriate the volumetric ratio of the heat transfer assisting member 70 to the hollow cavity 50 or the heat conductivity of the heat transfer assisting member 70. That is, with the heat transfer assisting member 70 provided inside the hollow cavity 50, the heat transference inside the hollow cavity can be controlled by both the heat adjusting agent and heat transfer assisting member. Accordingly, appropriate amounts of heat can be given according to regions of the tire. Also, it is possible to improve the mechanical strength of the base mold. Here, the volume of the heat transfer assisting member 70 is preferably set within a range of 5% to 50% of the volume of the hollow cavity 50. The setting in this range can not only secure a sufficient volume for holding the heat adjusting agent 60 but also help retain the influence on the control of heat conductivity inside the hollow cavity 50 by the adjustment of the heat adjusting agent 60.

That is, too large a volume of the heat transfer assisting member 70 may tend to excessively increase the dependency of the heat transference of the hollow cavity 50 on the volume of the heat transfer assisting member 70. As a result, it becomes difficult to control the heat transference by the adjustment of the heat adjusting agent 60. Thus, setting the volume of the heat transfer assisting member 70 in the above-mentioned range can leave ample leeway for controlling the heat transference by adjusting the heat adjusting agent 60. It is to be noted here that the arrangement may be such that the heat transfer assisting member 70 only is provided in the hollow cavity 50 without placing the heat adjusting agent 60 therein. Also, with the heat transfer assisting member 70 provided within the hollow cavity 50, the durability of the center-area molding range Rc can be improved.

Further, in the foregoing example, the heat transfer assisting member 70 is constituted by a plurality of columnar members 70a extending linearly between the radially inner surface 51 and the radially outer surface 52. However, the constitution to be employed is not limited to this. For example, a truss structure may be formed with the plurality of columnar members 70a inclined. Or a honeycomb structure may be constructed inside the hollow cavity 50 without using the columnar members 70a.

Figure 8:
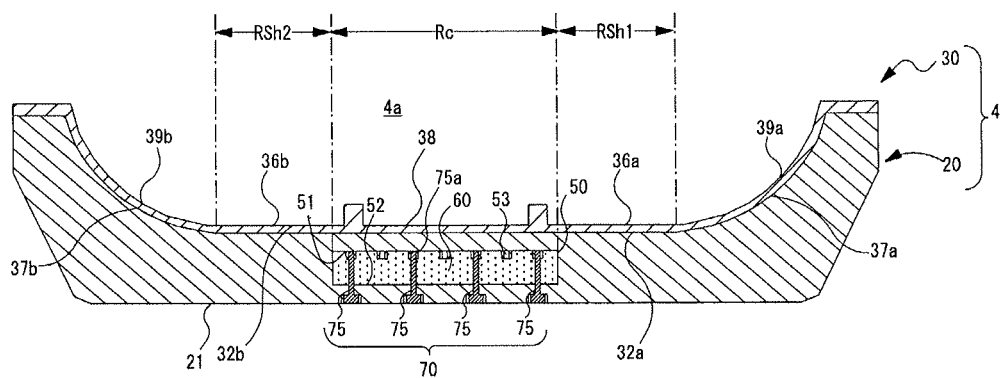
FIG. 8 illustrates an axial cross section of a sector mold according to a variation of the fifth embodiment.

FIG. 8 is an axial cross section of a sector mold 4 according to a variation of the fifth embodiment. This variation differs from the foregoing embodiment in that the heat transfer assisting member 70 can be removably inserted into the hollow cavity 50. As shown in FIG. 8, the heat transfer assisting member 70 in this implementation is constituted by bolts 75 that can be screwed in from the outer periphery 21 side. The threaded portions 75a formed at the end of the bolts 75 are screwed into the threaded holes 53 formed in the radially inner surface 51 defining the hollow cavity 50, and the bolts 75 extend linearly between the radially inner surface 51 and radially outer surface 52. Thus, the removable insertion of the heat transfer assisting member 70 from outside and the possibility of increasing or decreasing the number thereof make it possible to efficiently control the heat transference inside the hollow cavity by adjusting the occupancy of the heat transfer assisting member 70 in the hollow cavity 50. It is to be noted that in the example of the illustration, the bolts 75 are screwed in from the outer periphery 21 side. However, the arrangement may be such that predetermined threaded holes are made in the radially outer surface 52 and the bolts 75 are screwed in from the pattern molding surface 4a side. Or the arrangement may be such that the bolts 75 are screwed in from both sides.

In this manner, with the heat transfer assisting member removably inserted into the hollow cavity, the number of heat transfer assisting members can be increased or decreased readily and thus the heat transference inside the hollow cavity can be controlled efficiently.

Sixth Embodiment

Figure 9:
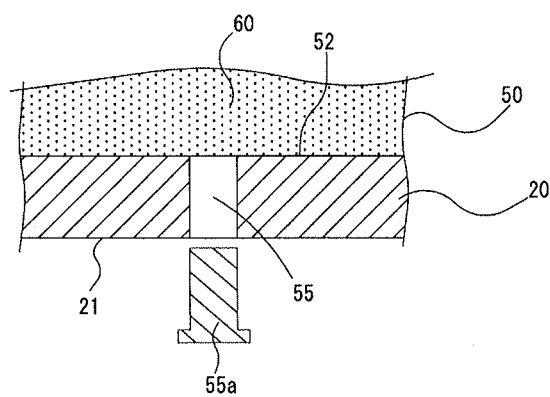
FIG. 9 is a partially enlarged illustration of a sector mold according to another embodiment (sixth embodiment).

FIG. 9 is a partially enlarged view of a sector mold 4 according to another embodiment. Compared with the previously described sector mold 4 having a hollow cavity 50, the sector mold 4 in this embodiment differs in that heat adjusting agent supply-discharge passage 55 communicating with the hollow cavity 50 in the base mold 20 is formed. The heat adjusting agent supply-discharge passage 55 is a conduit extending from the outer periphery 21 of the base mold 20 to the radially outer side 52 defining the shape of the hollow cavity 50. It is to be noted that the number and positions of the heat adjusting agent supply-discharge passages 55 are not subject to limitations. For example, a plurality of heat adjusting agent supply-discharge passages 55 may be formed along the axial direction or the circumferential direction of the hollow cavity 50. Then the work of supplying and discharging the heat adjusting agent 60 can be speeded up.

In this manner, heat adjusting agent supply-discharge passages communicating the hollow cavities with the outside are provided. Then heat adjusting agents formed of mutually different materials can be supplied and discharged as desired through the heat adjusting agent supply-discharge passages communicating the hollow cavities with the outside, thereby controlling the heat transference inside the hollow cavities. Moreover, it is possible to discharge the heat adjusting agent held in the hollow cavity to the outside and put it to reuse.

During the use of the sector mold 4 (curing of the tire T), the heat adjusting agent supply-discharge passage 55 is sealed by a sealing member 55a which is inserted or screwed into the sector mold 4 from the outer periphery 21 side of the base mold 20. The sealing member 55a, which is a pin member made at least of the same metal as the base mold 20, prevents the heat adjusting agent 60 held within the hollow cavity 50 from being released outside. On the other hand, the sealing member 55a is pulled out from the outside after the use of the sector mold 4. Then the hollow cavity 50 is communicated with the outside via the heat adjusting agent supply-discharge passage 55, thus making it possible to discharge and recover the heat adjusting agent 60 having been held within the hollow cavity 50. In this manner, the heat adjusting agent supply-discharge passage 55 is provided to allow communication between the hollow cavity 50 formed inside the base mold 20 and the outside. As a result, the heat adjusting agent 60 can be supplied and discharged as desired. And it becomes possible to supply and discharge the heat adjusting agent 60 as desired and thus to control as desired the heat transference inside the hollow cavity 50 in accordance with the gauge thickness of the tire T to be cured. Also, the possible reuse of the heat adjusting agent 60 having been held in the hollow cavity 50 helps promote resource saving and cost reduction. It should be noted that the same advantageous effects can be achieved by providing a plurality of heat adjusting agent supply-discharge passages 55 corresponding to the hollow cavities when a plurality of hollow cavities are to be formed.

Seventh Embodiment

Next, a description is given of another embodiment of the heat adjusting agent 60. In the foregoing embodiments, the heat adjusting agent 60 consists of a powdery or granular material. However, the heat adjusting agent 60 may consist of a product material 60C produced by melting and then solidifying the powdery or granular material. The following description will be given of a sector mold 4 having the spaces K1 and K2 as an example. In this example, the base mold 20 and the pattern mold 30 are assumed to be made of iron.

To place the heat adjusting agent 60 formed of the product material 60C in the spaces K1 and K2, a powdery or granular material of aluminum, for instance, whose melting point is lower than that of iron, is first laid in the agent holding recesses 29, 29 of the base mold 20. Then the open tops of the agent holding recesses 29, 29 are sealed with the pattern mold 30 as it is fitted to the base mold 20. Then the sector mold 4 is placed and heated in a not-shown heating oven. When the temperature inside the sector mold 4 reaches the melting point of aluminum, the powdery or granular material held inside the spaces K1 and K2 will get melted into a liquid. Then the sector mold 4 is removed from the heating oven and cooled to have the liquefied aluminum solidify inside the spaces K1 and K2. In this manner, the product material 60 which is the powdery or granular material of aluminum formed into a lump can be contained in the spaces K1 and K2 by melting and then solidifying the powdery or granular material of aluminum in the spaces K1 and K2. Also, to replace the product material 60C of aluminum held in the spaces K1 and K2, the sector mold 4 is again placed in the heating oven to melt and liquefy the product material 60C. Then the base mold 20 and the pattern mold 30 are disengaged from each other, and the liquefied aluminum is discharged outside. Thus, the use of the product material 60C, which is the powdery or granular material melted and then solidified, may raise the heat transference inside the spaces K1 and K2 much higher than when simply a powdery or granular material is placed therein.

In the above example, the powdery or granular material of aluminum is melted and then solidified. However, the arrangement may be such that two types or more of powdery or granular materials are melted and solidified as the product material 60C to be used as the heat adjusting agent 60 held therein. Also, in the above example, the powdery or granular material is melted and solidified inside the spaces K1 and K2. But the powdery or granular material may be liquefied by melting outside in advance, and then the liquefied material may be poured into the agent holding recesses 29, 29 to be solidified inside the spaces K1 and K2 with the pattern mold 30 attached. It is to be noted that the technique for using the product material 60C as the heat adjusting agent 60 can be applied in the same way to all the foregoing embodiments.

For example, with the sector mold 4 as shown in FIG. 5, the base mold 20 and the pattern mold 30 may be made of iron, and a powdery or granular material of aluminum and a powdery or granular material of copper may be laid in carpets of predetermined thickness in their respective ranges over the entire axial area of the inner periphery 22. Then the respective open axial ends are sealed with not-shown jigs, and the sector mold 4 is placed and heated inside the heating oven. As the temperature of the sector mold reaches the melting points of aluminum and copper, the powdery or granular materials held between the base mold 20 and the pattern mold 30 are in sequence melted into the respective liquids. Then the sector mold 4 is removed from the heating oven, and the liquefied aluminum and copper are cooled and solidified.

Method for Manufacturing Sector Mold

Now, a description is given of a main method for manufacturing a sector mold, using the sector mold 4 according to the fourth embodiment featuring a hollow cavity 50 formed inside the base mold 20 as an example. As already mentioned, the sector mold 4 is manufactured using a general metal casting process or an additive manufacturing process. In the additive manufacturing process in particular, the master data for the sector mold 4 configured by three-dimensional CAD data or the like is converted into a plurality of slice data (lamination data). Then the layers corresponding to the shape of the sector mold 4 represented by the converted slice data are laminated layer by layer. And the entire shape of the sector mold 4 represented by the master data is formed into the sector mold 4. Also, in the present example, the sector mold 4 consists of a combination of a base mold 20 and a pattern mold 30 mating therewith. Therefore, one master data corresponding to the sector mold 4 is divided into separate master data corresponding to the base mold 20 and the pattern mold 30, respectively.

Also, certain desirable methods are employable as the additive manufacturing process in manufacturing the base mold 20 and the pattern mold 30. In one of such methods, the layers corresponding to the shape represented by the respective slice data are formed into a shape successively as the metal powder, injected under irradiation of laser light, is melted and fused together in a molding machine which receives a plurality of slice data. In another, the layers corresponding to the shape represented by the respective slice data are formed into a shape as the metal powder, which has been placed in a chamber in advance, is irradiated with a laser and thus melted and fused together in a molding machine which receives a plurality of slice data.

Figure 10:
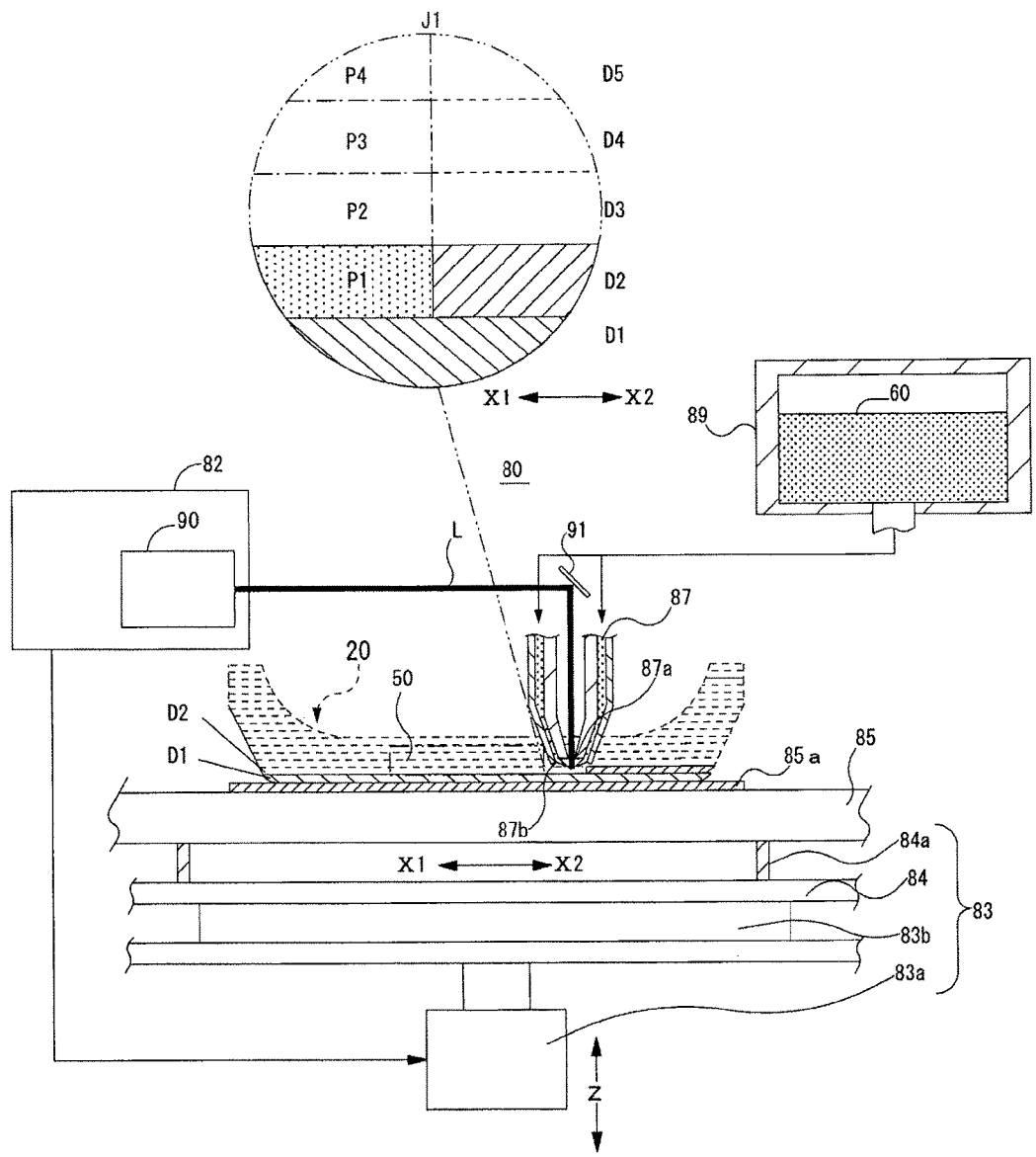
FIG. 10 is a schematic representation showing an example of an additive manufacturing apparatus.

FIG. 10 is a schematic illustration of an additive manufacturing apparatus 80. The additive manufacturing apparatus 80 is comprised of a control unit 82, which receives slice data and controls the related mechanisms based on the slice data, a scanning table 85, which is disposed on a table moving unit 83 and movable in the X-axis, Y-axis, and Z-axis directions, a nozzle mechanism 87, which casts a laser light while spraying a metal powder in the direction of the basis material 85a laid on the scanning table 85, a chamber 89, which supplies the metal powder constantly into the nozzle mechanism 87, and a laser output unit 90, which outputs laser light L to the nozzle mechanism 87. It is to be noted that in the present example, the nozzle mechanism 87 sprays iron powder, which is one example of the metal powder.

The scanning table 85 is disposed on the table moving unit 83. The table moving unit 83 is comprised of a lifting unit 83a, which moves the scanning table 85 up and down in the Z-axis direction, a slider mechanism 83b, which is disposed on a support plate movable in conjunction with the up-and-down motion of the lifting unit 83a, a movable plate 84, which is made slidable in the X-axis (right-left) direction by the slider mechanism 83b, and a slider mechanism 84a, which is disposed on the movable plate 84. The slider mechanism 84a supports the scanning table 85 slidably in the Y-axis (front-back) direction perpendicular to the X-axis direction. The lifting unit 83a and the slider mechanisms 83b and 84a are provided with their respective drive sources, such as motors, that operate according to the drive signals outputted from the control unit 82. With these drive sources repeatedly controlled according to the slice data, the corresponding layers are stacked successively into a shape represented by the slice data. It should be noted that in this example, the stacking direction is set to the direction from the radially outer side toward inner side of the base mold 20. Accordingly, once a layer corresponding to the first slice data is formed by the repeated scanning in the X-axis and Y-axis directions by the scanning table 85, the scanning table 85 lowers in the Z-axis direction. Then the layer corresponding to the slice data on the layer directly above is formed again by the repeated scanning in the X-axis and Y-axis directions by the scanning table 85. It is to be noted that in the present example, the additive manufacturing apparatus 80 moves the scanning table 85 in the X-axis, Y-axis, and Z-axis directions in relation to the interior of the nozzle mechanism 87. However, the arrangement may also be such that the nozzle mechanism 87 moves in relation to the scanning table 85 or that both of these units move, respectively. Also, the stacking direction may be the axial direction or the circumferential direction of the base mold 20.

The nozzle mechanism 87, which is a cylindrical member extending in the Z-axis direction, has an irradiation port 87a from which laser light L is cast toward the basis material 85a. The laser light L cast from the irradiation port 87a is generated by the laser output unit 90 located inside the control unit 82. The control unit 82 controls the laser output unit 90 based on the respective slice data, thereby controlling the execution of output, output timing, output duration, etc., of laser light L from the laser output unit 90. The light path of laser light L outputted from the laser output unit 90 is adjusted by a light path adjusting mirror 91. The laser light L reflected by the light path adjusting mirror 91 is cast to the basis material 85a after being passed through substantially the center of the irradiation port 87a disposed at the tip of the nozzle mechanism 87.

Disposed around the irradiation port 87a of the nozzle mechanism 87 is a spray nozzle 87b for spraying iron powder contained in the chamber 89 toward the basis material 85a. The iron powder to be sprayed from the spray nozzle 87b is constantly supplied from the chamber 89 which communicates with the spray nozzle 87b by way of a not-shown supply tube. The iron powder reaching the spray nozzle 87b is sprayed toward the basis material 85a to converge on the laser light L together with the shield gas jetted from a not-shown gas nozzle disposed immediately before the spray nozzle 87b. It is to be noted that the jetting of the shield gas is also controlled by the control unit 82.

The iron powder sprayed toward the basis material 85a is melted and fused together by the high-output laser light L irradiated from the irradiation port 87a. Thus, the shape represented by the slice data is formed with the scanning table 85 performing scanning in the X-axis and Y-axis directions according to the slice data while the irradiation of laser light L and the spray of iron powder are done at the same time by the nozzle mechanism 87.

Next, a description is given of an example of forming a hollow cavity 50 inside the base mold 20 by the additive manufacturing apparatus 80. The enlarged view in FIG. 10 is an illustration showing a state in which the forming of a second layer to be stacked on the first layer is progressing based on slice data D2 after the end of forming the first layer based on slice data D1 for the lowermost layer. As illustrated, the slice data D2 for the second layer contains a region P1 corresponding to a part of the shape of the hollow cavity 50 extending in the width direction of the base mold 20. Similarly, the slice data D3, D4, and D5 for the upper layers contain regions P2 to P4, respectively, corresponding to the parts of the shape of the hollow cavity 50.

From the position indicated in the illustration, the control unit 82 causes the scanning table 85 to scan in the direction of X1 to X2. And when the tip (laser light L) of the nozzle mechanism 87 reaches one end J1 of the width direction of the region P1, the control unit 82 causes the scanning table 85 to stop scanning toward X2. After the stop of scanning, the worker replaces the iron powder in the chamber 89 with a desired heat adjusting agent 60 other than iron powder. After the replacement with the heat adjusting agent 60, the control unit 82 resumes causing the scanning by the scanning table 85. Also, at this time, the control unit 82 controls the laser output unit 90 to stop the output of laser light L therefrom. On the other hand, the control unit 82 allows only the jetting of the shield gas and performs a control for the spray of the heat adjusting agent 60 onto the already formed first layer.

The heat adjusting agent 60 sprayed onto the first layer is left preserving its shape without being melted because the output of laser light L is stopped. Also, the state of the output of laser light L being stopped continues until the tip of the nozzle mechanism 87 reaches the other end of the width direction of the region P1 with the scanning table 85 scanning in the X2 direction. With the tip of the nozzle mechanism 87 reaching the other end of the width direction of the region P1, the control unit 82 again causes the scanning table 85 to stop scanning in the X2 direction. After the stop of scanning, the worker replaces the heat adjusting agent 60 in the chamber 89 with the iron powder. After the replacement with the iron powder, the control unit 82 causes the spray of the iron powder onto the first layer and at the same time resumes causing the irradiation of laser light L. With the resumption of the spray of iron powder and the irradiation of laser light L, the forming of parts other than the region P1 contained in the slice data D2 and the already formed part on the one end K1 side in the width direction is resumed. After this, the region P1 contained in the slice data D2 is formed as part of the hollow cavity 50 by the repetition of the exchanging between iron powder and heat adjusting agent 60 and the stop and resumption of laser light L output along with the scanning in the X-axis direction. Then the above-described control is repeated for slice data D3, D4, D5, . . . for the upper layers. Eventually, a hollow cavity 50 having a shape represented by the three-dimensional CAD data is formed within the base mold 20. And at the same time, a heat adjusting agent 60 can be placed in the hollow cavity 50. It is to be noted that by setting the amount of spray of the heat adjusting agent 60 in advance, the volume and density (or looseness) of the heat adjusting agent 60 to be held inside the hollow cavity 50 can be adjusted as desired.

Also, in the foregoing example, a description has been given of the case where the iron powder is replaced with a heat adjusting agent 60 other than the iron powder. However, if iron powder is used as the heat adjusting agent 60, the arrangement may be such that the output of laser light L only is stopped without stopping the scanning by the scanning table 85, thus leaving the iron powder as it is. Also, the arrangement may also be such that part of the powdery or granular material constituting the heat adjusting agent 60 is melted to change the size or density thereof by periodically or randomly casting the laser light L to the regions P1, P2, P3, . . . .

Although a description of a specific manufacturing process of the pattern mold 30 is omitted, it is to be appreciated that in the same way as with the base mold 20, the pattern mold 30 that can be fitted to the base mold 20 can be manufactured by controlling the scanning table 85 and the nozzle mechanism 87 based on the slice data of the master data corresponding to the pattern mold 30. Moreover, it is possible to easily manufacture the pattern mold 30 which has the predetermined recesses and projections for molding a tread pattern.

Also, in manufacturing a base mold 20 according to the fifth embodiment, part of the columnar member 70a may be formed by spraying iron powder or a metal material having a heat conductivity different from that of iron and at the same time irradiating laser light L when the tip of the nozzle mechanism 87 reaches the position of part of the heat transfer assisting member 70 (part of the columnar member 70a in the above example) in the regions P1, P2, P3, . . . defined in the slice data.

Also, in manufacturing a base mold 20 according to the sixth embodiment, the heat adjusting agent supply-discharge passage 55 communicating between the hollow cavity 50 and the outside of the base mold 20 can be formed within the base mold 20 by stopping both the irradiation of laser light L and spray of the heat adjusting agent 60 when the tip of the nozzle mechanism 87 reaches the region corresponding to a part of the heat adjusting agent supply-discharge passage 55. As for the manufacturing of a sector mold 4 according to the seventh embodiment, a process of placing the base mold 20 after the introduction of the heat adjusting agent 60 therein in a heating oven may be added, which is to be followed by the melting and then the solidification of the heat adjusting agent 60 into a product material 60C.

Also, as another embodiment of the method for manufacturing a tire mold, a method includes the steps of: melting and fusing together a powdery or granular material of a metal based on a plurality of slice data, which are respective sliced master data of a base mold and a pattern mold, stacking a plurality of the metal layers corresponding to the shape represented by the respective slice data, and forming the base mold and the pattern mold corresponding to the shapes represented by the respective master data, in which a part of the plurality of slice data of the master data of the base mold contains a region corresponding to a shape of a part of the hollow cavity to be provided within the base mold, and in which the melting and fusing of the powdery or granular material is stopped, thus leaving the same or different powdery or granular material within the regions.

According to this embodiment, parts of a plurality of slice data of the master data of the base mold contain regions corresponding to the shape of parts of the hollow cavity to be provided within the base mold. And the melting and fusion of the powdery or granular material in the regions is stopped to leave the same or different powdery or granular material within the regions. As a result, a tire mold having a powdery or granular material held within the hollow cavity in the base mold can be obtained.

Also, another embodiment includes a generating step of melting and then solidifying the powdery or granular material left in the hollow cavity there.

According to this embodiment, a product material produced by melting and then solidifying the powdery or granular material can be held in the hollow cavity.

Heretofore, the present invention has been described with reference to a plurality of embodiments. However, the invention is not limited to those embodiments as described. It is evident to those skilled in the art that various combinations of the features of the embodiments can also be made without departing from the spirit of the invention.

DESCRIPTION OF REFERENCE NUMERALS 1 curing apparatus
2 lower side mold
3 upper side mold
4 sector mold
10 bladder
20 base mold
30 pattern mold
50 hollow cavity
55 heat adjusting agent supply-discharge passage
60 heat adjusting agent
80 additive manufacturing apparatus
85 scanning table
87 nozzle mechanism
K1, K2 Space

The invention claimed is:

1. A tire mold comprising:
   a base mold; and
   a pattern mold to be fitted to the base mold, the pattern mold having a surface part for molding a tread pattern on a tire;
   wherein a heat adjusting agent for adjusting amounts of heat to be transmitted to the tire through the surface part of the pattern mold is placed in a hollow cavity formed between the base mold and the pattern mold or inside the base mold,
   wherein the hollow cavity has a heat transfer assisting member disposed therein, and
   wherein the heat transfer assisting member is removably inserted in the hollow cavity.

2. The tire mold according to claim 1, wherein the heat adjusting agent is made of a material different from a material of the pattern mold or the base mold.

3. The tire mold according to claim 1, wherein the heat adjusting agent is of a powdery or granular material.

4. The tire mold according to claim 1, wherein the heat adjusting agent is of a metal.

5. The tire mold according to claim 3, wherein the heat adjusting agent is a product material produced by melting and then solidifying the powdery or granular material.

6. The tire mold according to claim 1, wherein a plurality of hollow cavities are provided independently of each other.

7. The tire mold according to claim 1, wherein a cubic volume of the heat transfer assisting member is in a range from 5% to 50% of a cubic volume of the hollow cavity.

8. The tire mold according to claim 1, wherein a heat adjusting agent supply-discharge passage communicating between the hollow cavity and outside of the base mold is provided.

\* \* \* \* \*